June 1, 1937.     H. V. REED     2,082,655
FRICTION CLUTCH
Filed Jan. 24, 1936     2 Sheets-Sheet 2
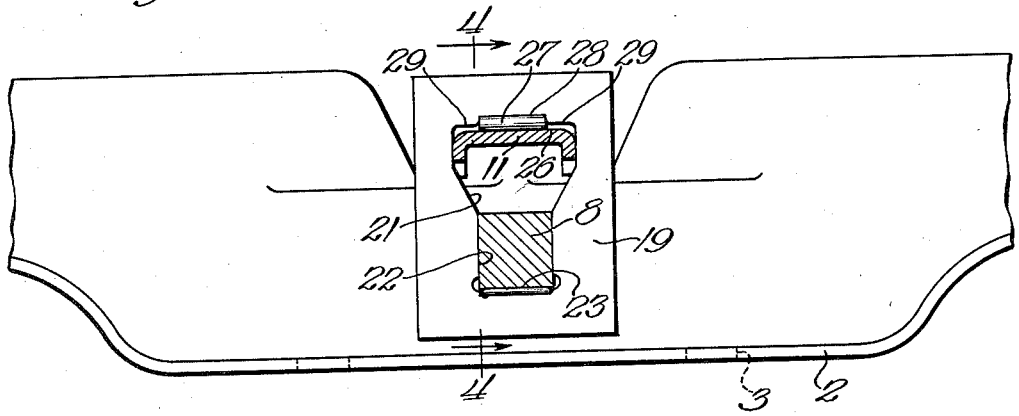
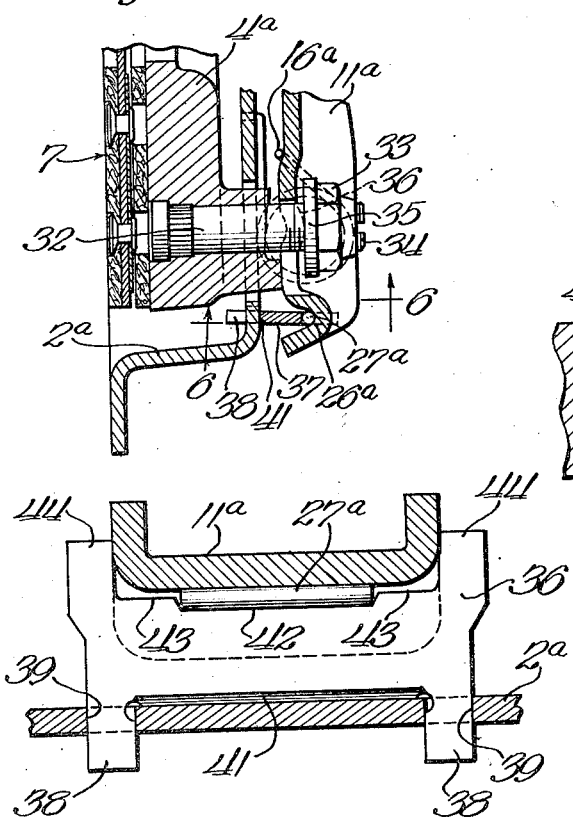
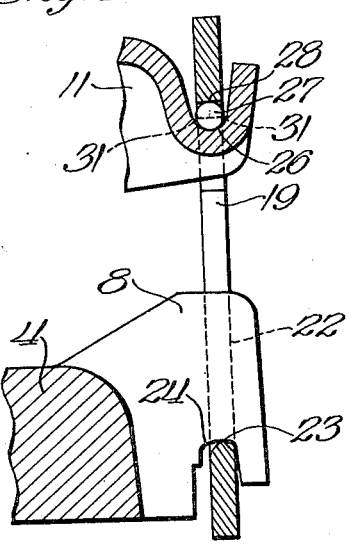
INVENTOR.
Harold V. Reed
BY
ATTORNEY.

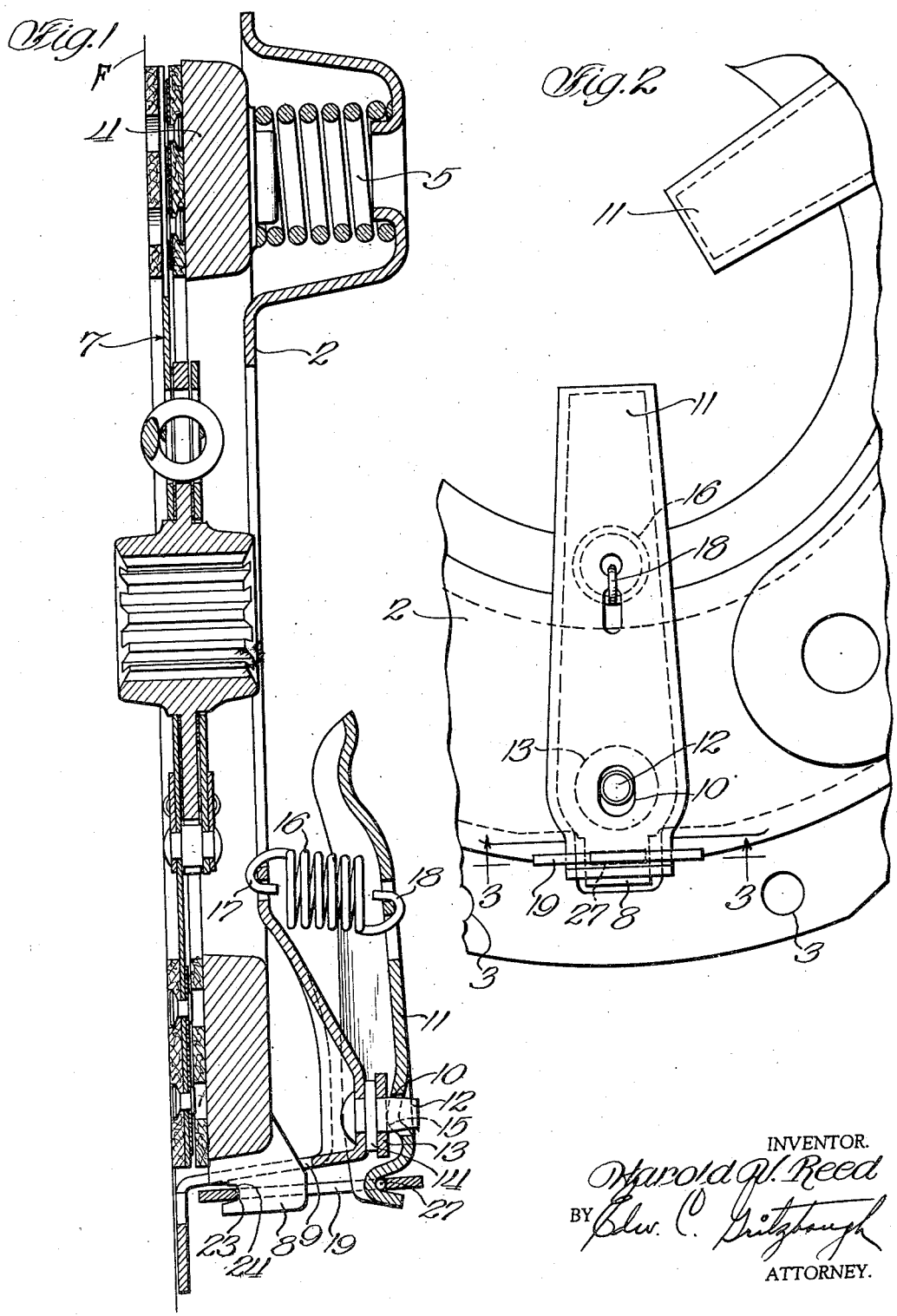

Patented June 1, 1937

2,082,655

UNITED STATES PATENT OFFICE 2,082,655

FRICTION CLUTCH

Harold V. Reed, Chicago, Ill., assignor to Borg-Warner Corporation, Chicago, Ill., a corporation of Illinois Application January 24, 1936, Serial No. 60,559

9 Claims. (Cl. 192—68)

This invention relates to improvements in friction clutches and more particularly to improvements in the construction and mounting of the pressure plate release lever assembly of friction clutches.

An object of the invention is to provide an improved friction clutch wherein the cooperating elements of the pressure plate release lever assembly are so constructed, combined and arranged as to provide, during operation, a rolling or rocking contact between all moving parts, thereby to eliminate friction and wear. In addition to the minimizing of replacement parts through wear, there is attained by my improved construction an important advantage in the reduction of manual force required to release the clutch which is attributable to the anti-friction characteristics of the improved assembly.

Another object is to provide in a friction clutch a pressure plate release lever assembly which occupies minimum space along the longitudinal axis of the clutch, thereby to permit of a closer coupling, if desired, between the driving and driven instrumentalities to which the clutch is adapted for use.

A further object is to provide an improved friction clutch wherein a replaceable anti-friction roller is employed in the operating mechanism, said roller having the added function of providing adjustment in alignment of the pressure plate operating levers through replacement by a roller of greater or lesser diameter.

Other objects, advantages and uses of the invention will become apparent after reading the following specification and claims, and after consideration of the drawings forming a part of the specification, wherein:

Fig. 1 is a vertical sectional view of a motor vehicle friction clutch constructed in accordance with the invention;

Fig. 2 is a fragmentary rear plan view of the clutch of Fig. 1;

Fig. 3 is a sectional view along the line 3—3 of Fig. 2;

Fig. 4 is an enlarged sectional view along the line 4—4 of Fig. 3;

Fig. 5 is a fragmentary vertical section of another embodiment of the invention, and Fig. 6 is a sectional view along the line 6—6 of Fig. 5.

I have selected for illustration herein a friction clutch of the type intended for use in motor vehicles to provide a normally engaged driving connection between the engine and the transmission shafts of the vehicle.

With reference to Fig. 1, the clutch may include a cover plate 2 having bolt openings 3 for attachment of the plate to the flywheel assembly of the vehicle, and an annular pressure plate 4 located within the cover and urged forwardly under the influence of a plurality of compression springs 5 interposed between the cover plate and the pressure plate, as shown. A driven clutch disc assembly 7, which may be constructed after the manner disclosed in my co-pending joint U. S. application Serial No. 49,653, is interposed between the pressure plate 4 and the adjacent face F of the flywheel assembly of the motor vehicle when the clutch is installed in the vehicle.

Lugs 8 may be formed on the periphery of the pressure plate 4 and extend radially outward therefrom through suitable openings 9, formed in the adjacent wall of the cover plate 2. In the present clutch there are three such lugs, one for each of the release lever assemblies hereinafter described. The lugs 8 and openings 9 are so arranged as to preclude relative rotation between the pressure plate and cover plate thereby to cause the pressure plate to rotate as a part of the cover assembly.

With reference to Figs. 1 to 4 inclusive, it will be noted that my improved clutch release lever assembly may comprise three release levers 11 preferably formed of sheet steel, by stamping with suitable heat treatment for hardening. Each lever 11 is pivotally mounted upon the cover plate 2 and each is spaced at equal distances from one another upon radial lines extending from the axis of rotation of the clutch assembly. The pivotal mounting for the levers 11 is provided by tapered pins 12 fixed to the rearward face of the cover 2 and flat steel washers 13 encircling the pins and supported upon shoulders 14 integral therewith. The tapered portion of the pin 12 serves to locate the lever against longitudinal displacement relative to the cover assembly, and the washer 13 provides a flat bearing surface against which a rounded projection 15 formed in the lever may bear, thus to provide a rolling pivotal action between the lever and the washer 13 as the lever is oscillated.

Tension springs 16 may interconnect the cover plate 2, as shown at 17, with each of the levers 11, as indicated at 18, for the purpose of drawing the inward ends of the levers toward the cover, thus to place the links 19 which interconnect the outer ends of the levers with the pressure plate lugs 8 under constant tension.

The links 19 (see Figs. 3 and 4) may comprise steel stampings each having an opening 21 punched therethrough, the lower portion 22 of the opening closely conforming with the rectangular cross sectional contour of the lug 8. I prefer to form the edge 23 of the opening 21 with a forty-five degree bevel on each side of the link so as to provide a "knife-like" bearing between the link and the wall of a recess 24 formed in the adjacent surface of the lug 8, as indicated in Figs. 3 and 4. This construction provides for an anti-friction rocking contact between the link and pressure plate.

Connection between the opposite ends of the links and the outer ends of the levers 11 is provided by the formation of a curved socket 26 formed in each of the levers transversely of their longitudinal axes within which steel rollers 27 are located. Each roller serves directly to support the flat wall portion 28 of the opening 21 in the link, thereby to establish a rolling contact between the link 19 and the roller 27. In order that the link may not move relative to the lever 11, in such a manner as to become displaced from direct force-transmitting engagement with the roller 27, I provide inwardly extending portions 29 on each side of the wall 28, which extend toward the lever a distance equal substantially to half the diameter of the roller. These portions 29 provide rigid contact corners 31 (see Fig. 4) which are free to engage with the wall of the curved socket 26 of the lever, upon protracted relative lateral movement of the link, thus to preclude displacement of the link 19 from its normal engagement with the roller 27.

The clutch release lever assembly, thus described, provides for the retraction of the pressure plate 4 against the force of the springs 5 upon the application of minimum manual force for the reason that all points of engagement between moving parts of the assembly, through which force is transmitted, are possessed of anti-friction characteristics. There is no rubbing or sliding action present in the assembly by means of which frictional resistance may be encountered. All of the parts are so constructed and so arranged one relative to the other that none may be displaced during operation of the clutch to impair the proper functioning of the assembly.

An added advantage attributable to my improved release lever assembly is that adjustment between levers and pressure plate may be carried out by replacement of the roller 27 with a roller of greater or lesser diameter. This provides a very simple, quick and desirable method of compensation for non-conformity in position between the several levers 11 employed in the entire clutch assembly.

In Figs. 5 and 6 I have illustrated another embodiment of my invention in which the levers 11a are of the "pull" type as distinguished from the "push" type represented in Fig. 1. In this form of the assembly the pressure plate 4a is provided with a lifting bolt 32, one for each lever, extending through the pressure plate and through the cover plate 2a. An adjustable nut 33 may be located upon the threaded rearward end 34 of each of the bolts 32. Washers 35 placed against the nuts 33 provide flat bearing surfaces for the curved portions 36 of the levers 11a, much in the same manner as described in connection with the mounting shown in Fig. 1. A torsion spring 16a may be interposed between each of the levers and the cover plate to place the levers under initial tension tending to draw their inner ends away from the cover plate.

Instead of the tension link 19, in this form of the assembly I employ a strut 37 having ears 38 at one end which extend through suitable openings 39 formed in the cover plate, the edge 41 of the strut, between the ears 38, being formed with oppositely beveled portions to provide a knife-like contact with the rear face of the cover plate. Rollers 27a are interposed between curved sockets 26a in the levers 11a and the flat bearing faces or walls 42 of the struts 37. Portions 43 of the struts, having the same function as the portions 29 of the links 19, are formed at each end of the walls 42 of the struts to prevent longitudinal displacement of the rollers 27a and to guard against displacement of the struts from direct force-transmitting contact with the rollers 27a. At the rearward end of the struts, I prefer to form extensions 44 engageable with the adjacent walls of the levers 11a to preclude relative lateral displacement between the levers and struts.

The assembly of Figs. 5 and 6 operates precisely in the same manner as the assembly of Figs. 1 to 4 inclusive as to the minimizing of friction between the moving parts of the clutch operating mechanism.

I claim:

1. In a friction clutch, a pressure plate, spring means urging said plate in one direction, a lever mounted for pivotal movement, a member for transmitting force from said lever to said plate against the action of said spring means, and a roller interposed between said member and said lever, said member being floatingly mounted relative to said plate and said lever and free to move pivotally relative thereto.

2. The combination, defined in claim 1, wherein said lever, said member and said roller are so proportioned and arranged, one relatively to the others, as to cause all of the force transmitted through said member to be transmitted through said roller, and wherein the member and the roller undergo a rolling contact during oscillation of the lever.

3. In a friction clutch, a pressure plate, spring means urging said plate in one direction, a lever mounted for pivotal movement, a strut for transmitting force from said lever to said plate against the action of said spring means, a roller interposed between said strut and said lever, and means associated with said lever and said strut acting to maintain said strut in constant force-transmitting relationship with said roller, said strut being floatingly mounted relative to said plate and said lever and free to move pivotally relative thereto.

4. In a friction clutch, a pressure plate, a lever mounted for pivotal movement, said lever having a curved socket extending transversely to its longitudinal axis at one end portion thereof, a member engaged at one of its end portions with said pressure plate and having a portion at its other end extending toward the inner wall of said socket, and a roller located in said socket and held in place by engagement with said last named portion of said member, the parts being so arranged that movement of said lever is transmitted to said member through said roller.

5. In a friction clutch, a pressure plate, spring means acting on said plate in one direction, a lever mounted for pivotal movement, a member for transmitting force from said lever to said plate against the action of said spring means, and a roller interposed between said member and said lever, said lever and said member being formed with portions adjacent to the roller cooperating to maintain the member in engagement with the roller and to preclude axial movement of said roller, said member being floatingly mounted relative to said plate and said lever and free to move pivotally relative thereto.

6. In a friction clutch, a pressure plate, a lever, a pivotal mounting for said lever providing a rolling action between the lever and the mounting during oscillation of the lever, a tension link engaged with said pressure plate at one end and in register with a portion of said lever at its other end, and a roller interposed between said lever portion and said other end of said link whereby to provide a rolling contact between the link and the roller during oscillation of the lever.

7. The combination, defined in claim 6, wherein the link is provided with a rocking contact with said pressure plate.

8. In the combination, defined in claim 6, a spring urging said lever on its pivotal mounting in a direction to maintain said link under tension.

9. In a friction clutch, a pressure plate, spring means acting on said plate in one direction, a lever mounted for pivotal movement, a tension link floatingly mounted relative to said plate and said lever and free to pivot relative thereto for transmitting force from said lever to said plate against the action of said spring means, and a roller interposed between said link and said lever and forming the sole force-transmitting medium between said lever and said link.

HAROLD V. REED.